(12) United States Patent
Luo

(10) Patent No.: US 8,761,611 B2
(45) Date of Patent: Jun. 24, 2014

(54) WAVELENGTH ASSIGNMENT FOR MULTIPLE OPERATOR SUPPORT

(75) Inventor: Yuanqiu Luo, Cranbury, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 419 days.

(21) Appl. No.: 13/185,632

(22) Filed: Jul. 19, 2011

(65) Prior Publication Data

US 2012/0020666 A1   Jan. 26, 2012

Related U.S. Application Data

(60) Provisional application No. 61/365,845, filed on Jul. 20, 2010.

(51) Int. Cl.
*H04J 14/02* (2006.01)

(52) U.S. Cl.
USPC .......................................................... 398/168

(58) Field of Classification Search
CPC .. H04J 14/0246; H04J 14/0265; H04J 14/025
USPC ..................................................... 398/68–72
See application file for complete search history.

(56) References Cited

U.S. PATENT DOCUMENTS

| | | | |
|---|---|---|---|
| 2002/0196491 | A1 | 12/2002 | Deng et al. |
| 2006/0275038 | A1* | 12/2006 | Walton et al. ................... 398/71 |
| 2009/0202245 | A1* | 8/2009 | Bouda .............................. 398/76 |
| 2009/0251768 | A1* | 10/2009 | Iannone et al. ................ 359/334 |
| 2012/0183289 | A1* | 7/2012 | Lou et al. ........................... 398/9 |
| 2013/0209095 | A1* | 8/2013 | Barnard et al. ................. 398/34 |

FOREIGN PATENT DOCUMENTS

CN   101621723 A   1/2010

OTHER PUBLICATIONS

Foreign Communication From a Related Counterpart Application, International Application No. PCT/CN2011/077346, International Search Report dated Jan. 26, 2012, 4 pages.
Roeloffzen, C., et al., "Service and Network Requirements," BBPhotonics access/D1.1, BBP Deliverable 1.1, Mar. 31, 2005, 25 pages.
Chang, G., et al., "Key Technologies of WDN-PON for Future Converged Optical Broadband Access Networks [Invited]," J. Opt. Commun. Netw, vol. 1, No. 4, Sep. 2009, 16 pages.
Sun, X., et al., "A Novel Star-Ring Protection Architecture Scheme for WDM Passive Optical Access Networks," Optical Fiber Communication Conference, 2005, Technical Digest OFC/NFOEC, Mar. 11, 2005, 3 pages.

(Continued)

*Primary Examiner* — Leslie Pascal
(74) *Attorney, Agent, or Firm* — Conley Rose, P.C.; Grant Rodolph; Jonathan K. Polk

(57) ABSTRACT

An apparatus comprising a plurality of optical line terminals (OLTs) corresponding to different providers that share an optical distribution network (ODN), a plurality of optical network units (ONUs) coupled to the OLTs via the same ODN and configured to communicate with the different OLTs using different corresponding pairs of upstream and downstream channels, wherein the upstream and downstream channels are interleaved across a plurality of wavelength bands and comprise a sequence of alternating and contiguous upstream and downstream channels, are aligned with a plurality of wavelength division multiplexing (WDM) channels, and satisfy a plurality of design requirements for the OLTs and ONUs.

20 Claims, 8 Drawing Sheets

(56) References Cited

OTHER PUBLICATIONS

Chowdury, A., et al., "A Self-Survivable WDN-PON Architecture with Centralized Wavelength Monitoring, Protection and Restoration for both Upstream and Downstream Links," OFC/NFOEC2008, Feb. 28, 2008, 3 pages.

Sun, X., et al., "A Survivable WDM-PON Architecture With Centralized Alternate-Path Protection Switching for Traffic Restoration," IEEE Photonics Technology Letters, vol. 18, No. 4, Feb. 15, 2006, pp. 631-633.

Akanbi, O., et al., "A New Scheme for Bidirectional WDM-PON Using Upstream and Downstream Channels Generated by Optical Carrier Suppression and Separation Technique," IEEE Photonics Technology Letters, vol. 18, No. 2, Jan. 15, 2006, 3 pages.

"Series G: Transmission Systems and Media, Digital Systems and Networks—Transmission Media Characteristics—Characteristics of Optical Components and Subsystems—Spectral Grids for WDM Applications: CWDM Wavelength Grid," ITU-T G.694.2, Jun. 2002, 12 pages.

"Series G: Transmission Systems and Media, Digital Systems and Networks—Digital Sections and Digital Line System—Optical Line Systems for Local and Access Networks—Gigabit-Capable Passive Optical Networks (G-PON): Enhancement Band," ITU-T G.984.5, Sep. 2007, 22 pages.

Itut, "Series G: Transmission Systems and Media, Digital Systems and Networks, Transmission Media Characteristics—Characteristics of Optical Components and Subsystems, Spectral Grids for WDM Applications: CWDM Wavelength Grid," G.694.2, Dec. 2003, 12 pages.

ITUT, "Series G: Transmission Systems and Media, Digital Systems and Networks, Digital Sections and Digital Line System-Optical Line Systems for Local and Access Networks, Gigabit-Capable Passive Optical Networks (GPON): Physical Media Dependent (PMD) Layer Specification," G.984.2, Mar. 2003, 38 pages.

ITUT, "Series G: Transmission Systems and Media, Digital Systems and Networks, Digital Sections and Digital Line System-Optical Line Systems for Local and Access Networks, 10-Gigabit-Capable Passive Optical Networks (XG-PON): Physical Media Dependent (PMD) Layer Specification," G.987.2, Oct. 2010, 38 pages.

IEEE P802.3av™, "Draft Standard for Information Technology—Telecommunication and Information Exchange Between Systems—Local and Metropolitan Area Networks—Specific Requirements, Part 3: Carrier Sense Multiple Access With Collision Detection (CSMA/CD) Access Method and Physical Layer Specifications, Amendment: Physical Layer Specifications and Management Parameters for 10 Gb/s Passive Optical Networks," IEEE Computer Society, Dec. 3, 2008, 267 pages.

IEEE 802.3ah™, "Information Technology—Telecommunication and Information Exchange Between Systems—Local and Metropolitan Area Networks—Specific Requirements, Part 3: Carrier Sense Multiple Access With Collision Detection (CSMA/CD) Access Method and Physical Layer Specifications, Section 5," IEEE, 2005, 417 pages.

\* cited by examiner

WAVELENGTH ASSIGNMENT FOR MULTIPLE OPERATOR SUPPORT

CROSS-REFERENCE TO RELATED APPLICATIONS

The present application claims priority to U.S. Provisional Patent Application 61/365,845, filed Jul. 20, 2010 by Yuanqiu Luo and entitled "Wavelength Assignment for Multiple Operator Support," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network units (ONUs) at the customer premises. In some PON systems, such as Gigabit PON (GPON) systems, downstream data is broadcasted at about 2.5 Gigabits per second (Gbps) while upstream data is transmitted at about 1.25 Gbps. However, the bandwidth capability of the PON systems is expected to increase as the demands for services increase. To meet the increased demand in services, some emerging PON systems, such as Next Generation Access (NGA) systems, are being reconfigured to transport the data frames with improved reliability and efficiency at higher bandwidths, for example at about ten Gbps.

SUMMARY

In one embodiment, the disclosure includes an apparatus comprising a plurality of OLTs corresponding to different providers that share an ODN, a plurality of ONUs coupled to the OLTs via the same ODN and configured to communicate with the different OLTs using different corresponding pairs of upstream and downstream channels, wherein the upstream and downstream channels are interleaved across a plurality of wavelength bands and comprise a sequence of alternating and contiguous upstream and downstream channels, are aligned with a plurality of wavelength division multiplexing (WDM) channels, and satisfy a plurality of design requirements for the OLTs and ONUs.

In another embodiment, the disclosure includes a network component comprising a plurality of band pass filters arranged and configured to pass a plurality of interleaved upstream and downstream channels that comprise a sequence of alternating and contiguous upstream and downstream channels associated with a plurality of optical line terminals, and a plurality of ports that each corresponds to one of the OLTs and that are coupled to the band pass filters and configured to transmit and receive a plurality of pairs of upstream and downstream channels from the interleaved of upstream and downstream channels that correspond to a plurality of providers.

In a third aspect, the disclosure includes a PON wavelength assignment method comprising assigning, with a processor, a plurality of interleaved wavelength channels across a plurality of wavelength bands comprising a sequence of alternating upstream and downstream channels, aligning the centers of the interleaved wavelength channels with the centers of a plurality of WDM channels, and implementing a multi-port filter comprising a number of band pass filters that match the number of upstream and corresponding downstream channels.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typical GPON and ten GPON (XGPON) wavelength plans are designed for a single operator to serve the operator's customers. In some access networks, there may be requirements to support multiple operators by using the same ODN. However, separate OLTs may still be required to support different operators and their corresponding customers. For such access networks, one of the proposed solutions, e.g., according to the International Telecommunication Union Telecommunication Standardization Sector (ITU-T) G.694.2 standard which is incorporated herein by reference, relies on assigning different wavelengths to different operators to share the ODN. However, such solution follows the system WDM grid without considering network equipment features. This may increase cost and/or require additional or more advanced equipment.

Since access networks are typically cost sensitive, it may be advantageous or beneficial to implement a wavelength assignment scheme to share the deployed PON outside a plant, retain typically used un-cooled lasers at the ONUs, and avoid the employment of more advanced Dense WDM (DWDM) systems (e.g., instead of coarse WDM (CDWM) technology). Such requirements may be satisfied by reusing the investment on ODNs and assigning different wavelengths to different operators while maintaining the GPON or XGPON equipment design aspect.

Disclosed herein is a system and method for providing wavelength assignment to accommodate multiple operators. The wavelength assignment may be based on using the same ODN to enable different operators to service their customers. The wavelength assignment may also support currently or typically used ONU/OLT design aspects. The system and method may comprise interleaving a plurality of upstream and downstream channels and allowing non-zero guard bands between the channels, which may improve system efficiency. The channel wavelengths may be aligned based on CDWM technology, which may reduce cost and may substantially conform to typical GPON or XGPON channel plans or apply to new PON system designs if required. Details and embodiments of the wavelength assignment scheme and plan are described further below.

Figure 1:
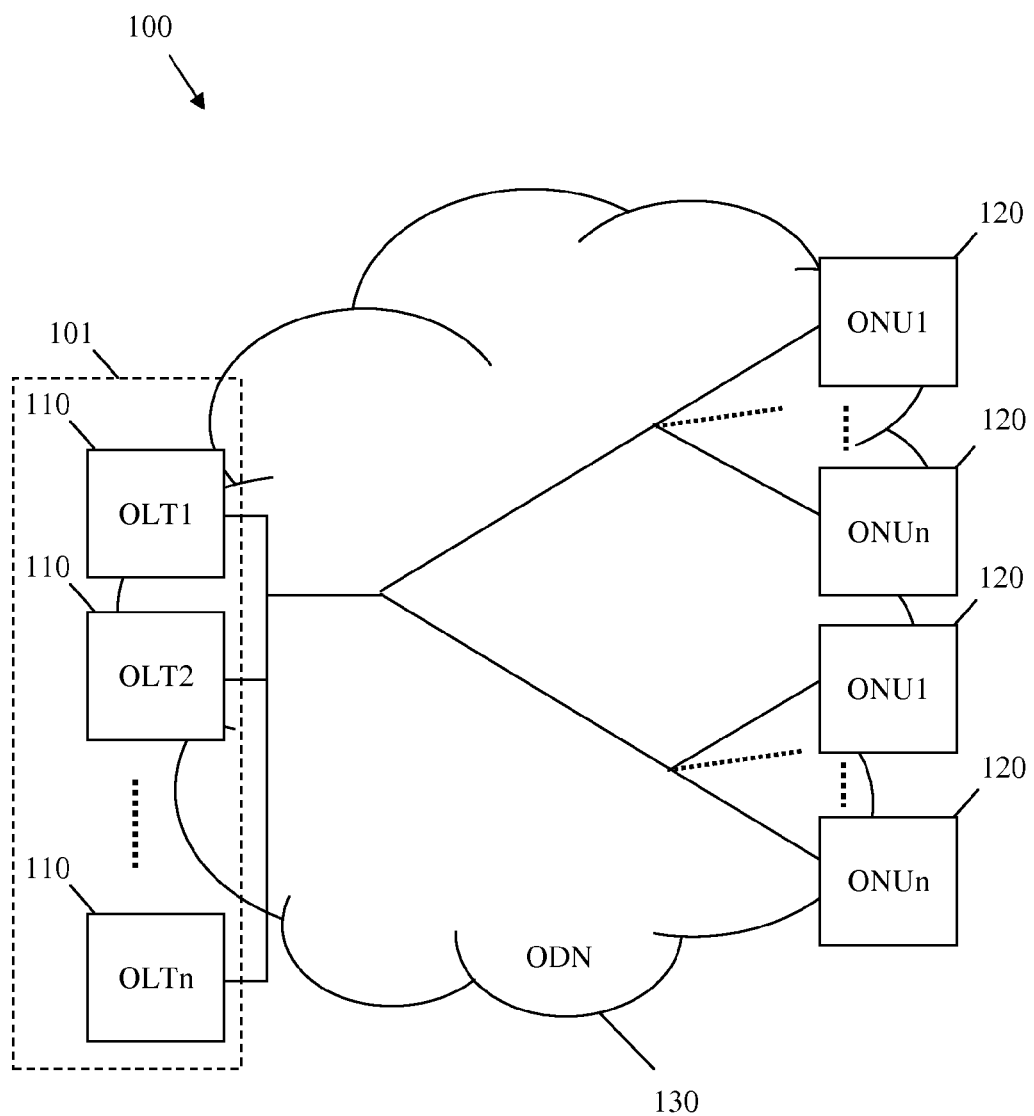
FIG. 1 is a schematic diagram of an embodiment of a PON.

FIG. 1 illustrates one embodiment of a PON 100 which may support multiple service providers or operators. The PON 100 may comprise a plurality of OLTs 110 (e.g., OLT1, OLT2 . . . , OLTn, where n is an integer) at a central office 101, a plurality of ONUs 120, and an ODN 130, which may be coupled to the OLTs 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. The PON 100 may be Next Generation Access (NGA) systems, such as XGPONs, which may have a downstream bandwidth of about ten Gbps and an upstream bandwidth of at least about 2.5 Gbps. Other examples of suitable PONs 100 include the asynchronous transfer mode PON (APON) and the broadband PON (BPON) defined by ITU-T G.983 standard, the GPON defined by the ITU-T G.984 standard, the Ethernet PON (EPON) defined by the Institute of Electrical and Electronics Engineers (IEEE) 802.3ah standard, the 10 Gigabit EPON as described in the IEEE 802.3av standard, and the WDM PON (WPON), all of which are incorporated herein by reference as if reproduced in their entirety.

The ONUs 120 may comprise a plurality of subsets of ONUs, where each subset may correspond to or communicate with one corresponding OLT 110. For example, one or more ONU1's may be associated with OLT1, one or more ONU2's may be associated with OLT2 . . . , and one or more ONUn's may be associated with OLTn. Each subset of ONUs 120 may communicate with the corresponding OLT 110 using at least a pair of upstream and downstream channels. The upstream and downstream channels for each subset of ONUs 120 and corresponding OLT 110 may be assigned different wavelengths (e.g., one wavelength for upstream channel and another wavelength for downstream channel) than the other subsets of ONUs 120 and corresponding OLTs 110. In some embodiments, the same ONU 120 may communicate with different OLTs 110 using the different corresponding wavelength channels.

In an embodiment, the OLTs 110 may be any devices that are configured to communicate with the ONUs 120 and one or more other networks (not shown). Specifically, each OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking (SONET)/Synchronous Digital Hierarchy (SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONUs 120 may be any devices that are configured to communicate with the corresponding OLTs 110 and a customer or user (not shown). Specifically, the ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to a corresponding OLT 110 and an optical receiver configured to receive optical signals from the OLT 110. Additionally, the ONUs 120 may comprise a converter that converts the optical signal into electrical signals for the customer, such as signals in the Ethernet protocol, and a second transmitter and/or receiver that may send and/or receive the electrical signals to a customer device. In some embodiments, ONUs 120 and optical network terminals (ONTs) are similar, and thus the terms are used interchangeably herein. The ONUs may be typically located at distributed locations, such as the customer premises, but may be located at other locations as well.

In an embodiment, the ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLTs 110 and the ONUs 120. Alternatively, the ODN 130 may comprise one or a plurality of processing equipment, such as optical amplifiers. The ODN 130 may typically extend from the OLTs 110 (or the central office 101) to the ONUs 120 in a branching configuration as shown in FIG. 1, but may be alternatively configured in any other point-to-multi-point configuration.

Figure 2:
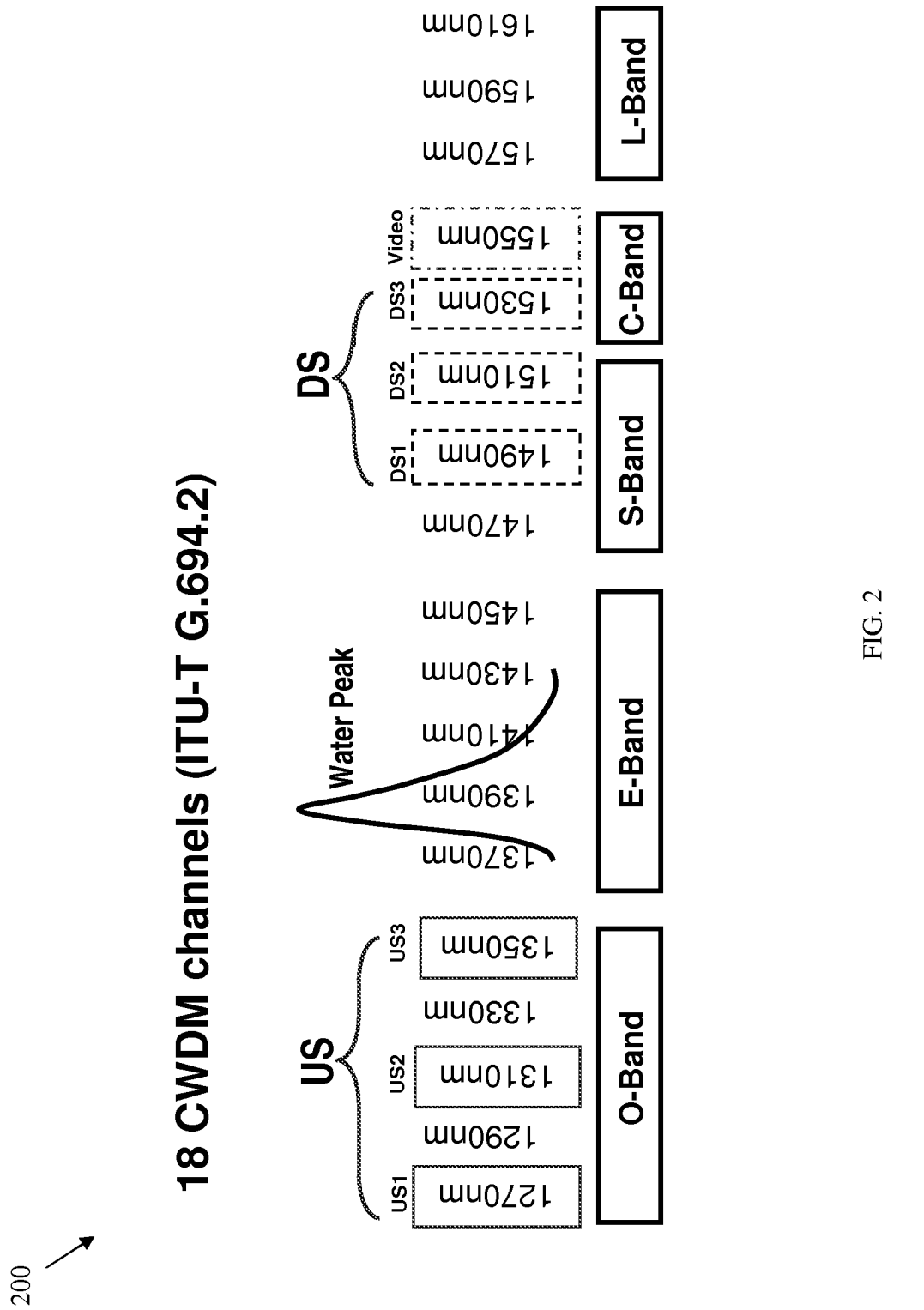
FIG. 2 is a schematic diagram of an embodiment of a wavelength assignment scheme.

FIG. 2 illustrates an embodiment of a wavelength assignment scheme 200 proposed by ITU-T G.694.2. The wavelength assignment scheme 200 may assign a plurality of upstream and downstream channels to different operators, e.g., different groups of OLTs and ONUs. The assigned upstream and downstream channels may be selected from about 18 CWDM wavelength channels, which may be distributed across a plurality of wavelength bands, including an O-band, an E-band, a S-band, a C-band, and a L-band. The CWDM channels may be supported by OLTs/ONUs that support CWDM technology.

The O-band may comprise about five CWDM channels, which may be positioned at about 1,270 nanometers (nm), about 1,290 nm, about 1,310 nm, about 1,330 nm, and about 1,350 nm. The E-band may also comprise about five CWDM channels, which may be positioned at about 1,370 nm, about 1,390 nm, about 1,410 nm, about 1,430 nm, and about 1,450 nm. The S-band may comprise about three CWDM channels, which may be positioned at about 1,470 nm, about 1,490 nm, and about 1,510 nm. The C-band may comprise about two CWDM channels, which may be positioned at about 1,530 nm and about 1,550 nm. The L-band may also comprise about three CWDM channels, which may be positioned at about 1,570 nm, about 1,590 nm, and about 1,610 nm.

According to ITU-T G.694.2, the upstream channels may be assigned in the O-band and may comprise a first upstream channel (US1) at about 1,270 nm, a second upstream channel (US2) at about 1,310 nm, and a third upstream channel (US3) at about 1,350 nm. The downstream channels may be assigned in the S-band and C-band and may comprise a first downstream channel (DS1) at about 1,490 nm, a second downstream channel (DS2) at about 1,510 nm, and a third downstream channel (DS3) at about 1,530 nm. An additional video channel, e.g., for video broadcasting or downstreaming, may be assigned in the C-band at about 1,550 nm. The three upstream channels (US1, US2, and US3) and the three corresponding downstream channels (DS1, DS2, and DS3) may be assigned to three corresponding providers that share an ODN.

The CWDM channels in the E-band may not be used due to an undesired water peak characteristic that may not be suitable for optical signal transmissions at that band. Further, the CWDM channels at about 1,290 and about 1,330 nm of the O-band may not be used for communications and may be reserved instead to maintain band gaps between the upstream channels US1, US2, and US3. The band gaps may be necessary to ensure proper operation and detection for the different providers, e.g., to prevent crosstalk or interference between the optical signals of the upstream channels. The band gap requirement in the O-band may not allow assigning any additional upstream channels to that band. The downstream channels may be assigned in the S-band and C-band as described above. The band gap requirements for the downstream channels may not be as stringent as the band gap requirements of the upstream channels. However, the overall band gap requirement for this multi-provider system may reduce the capacity of the system for wavelength assignment, i.e., reduce the number of available or usable CWDN channels for assigning upstream and downstream channels.

According to the ONU transmitter design in GPONs and XGPON, the ONU upstream channel bands (e.g., upstream channel width) are expected to be at about 20 nm. The PON diplexers, such as optical couplers used in G-PONs and XGPONs, may be designed to separate upstream and downstream channels that have a guard band of at least about 100 nm. Additionally, the ONU receiver filter is expected to have about 10 nm pass with about 5 nm guard band, which may support the design of CWDM filters and channels. Further, since optical reflections between different ONUs may be about −30 decibels per milliwatt (dBm), an isolation of about −15 decibel (dB) in the ONU may be implemented to effectively prevent interference between the ONUs. For the OLT design in GPONs and XGPONs, the OLT downstream bands (e.g., upstream channel width) are expected to be at about 10 nm. This may allow the OLT transmitter about 3 nm tolerance in the ambient temperature range of about 0-70 degrees Celsius (C). The OLT receiver filter is also expected to have about 20 nm pass band with about 5 nm guard band. When multiple operators share the same ODN, a new unbundling WDM filter may be desired to provide additive isolation among the operators.

Figure 3:
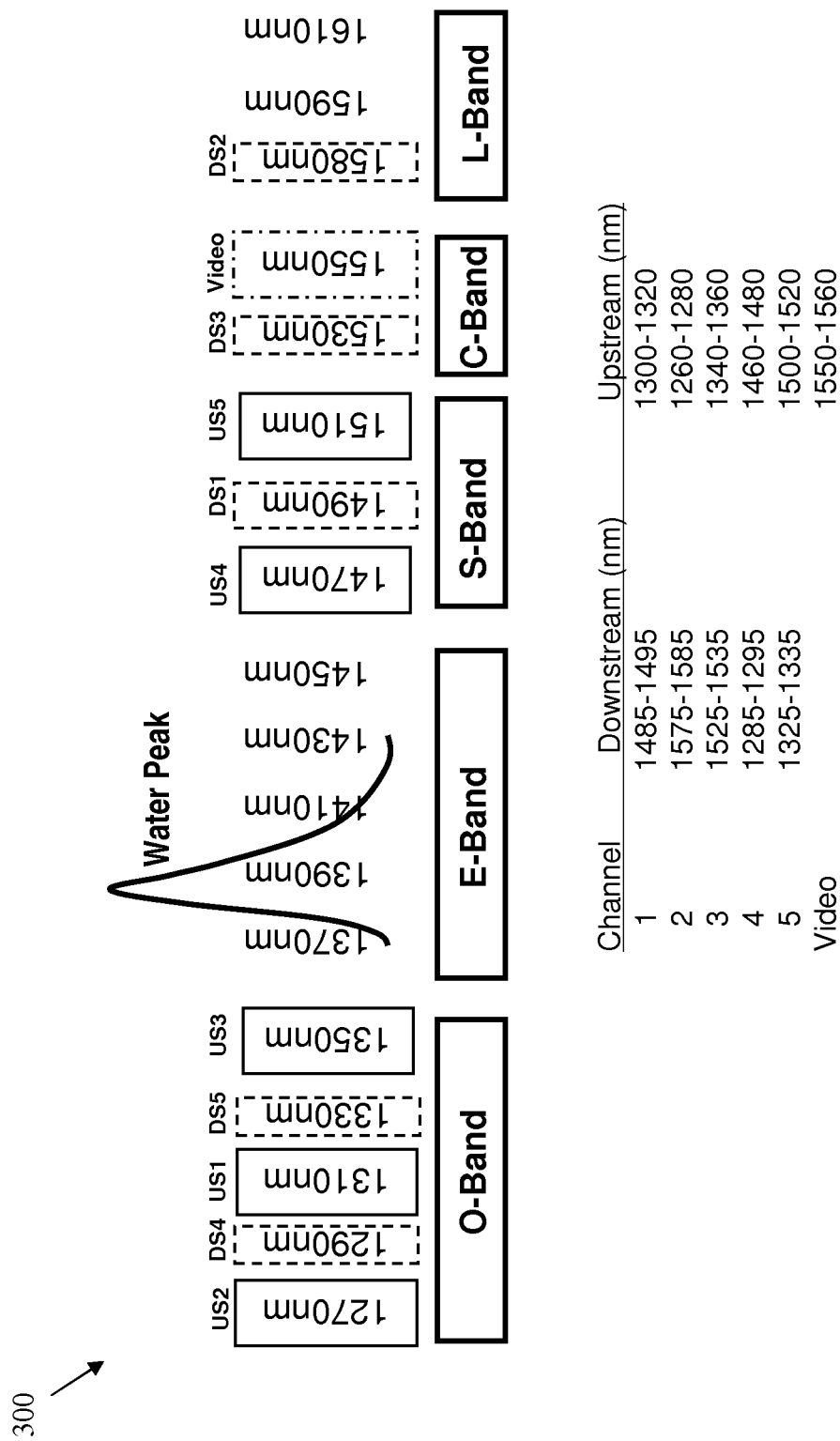
FIG. 3 is a schematic diagram of another embodiment of a wavelength assignment scheme.

To satisfy the above requirement for ONU/OLT design in typical GPON and XGPON systems, e.g., that use CWDM channels and technology, a plurality of upstream and downstream channels may be interleaved to improve the use of available channels. The upstream and downstream channels may be interleaved across the contiguous wavelength bands descried above. FIG. 3 illustrates an embodiment of an improved wavelength assignment scheme 300, which may be used in the PON 100. The improved wavelength assignment scheme 300 may allow using more upstream and downstream channels and hence support more providers than typical wavelength assignment schemes, e.g., the wavelength assignment scheme 200 proposed by ITU-T G.694.2. The upstream and downstream channels may be interleaved within multiple wavelength bands to allow the assignment of more channels for more operators while maintaining system design aspects.

Specifically, in the wavelength assignment scheme 300, the interleaved upstream and downstream channels may be arranged in a sequence of consecutive pairs of upstream and downstream channels across multiple wavelength bands. The wavelength bands may be the same wavelength bands for the CWDM channels described above. Both the upstream and downstream channels may be assigned to both the O-band and the C band. Additional downstream channels may also be assigned to the C-band and L-band. Specifically, a first upstream channel (US1) at about 1,310 nm, a second upstream channel (US2) at about 1,270 nm, and a third upstream channel (US3) at about 1,350 nm may be assigned to the O-band. Additionally, a fourth upstream channel (US4) at about 1,470 nm and a fifth upstream channel (US5) at about 1,510 may be assigned to the S-band. A first downstream channel (DS1) at about 1,490 nm may also be assigned to the S-band, a second downstream channel (DS2) at about 1,580 nm may be assigned to the L-band, and a third downstream channel (DS3) at about 1,530 nm may be assigned to the C-band. Additionally, a fourth downstream channel (DS4) at about 1,290 nm and a fifth downstream channel (DS5) at about 1,330 nm may be assigned to the O-band. The five upstream channels (US1, US2, US3, US4, and US5) and the five corresponding downstream channels (DS1, DS2, DS3, DS4, and DS 5) may be assigned to five corresponding providers that share an ODN. Further, a band for broadcasting video services (e.g., at about 1550 nm-1560 nm) may be reserved in the C-band.

Each pair of interleaved and contiguous upstream and downstream channels across the O-band and the S-band may provide a reasonable or sufficient diplexer filter guard band, where the downstream channels interleaved between the upstream channels may serve as guard bands for the downstream channels. Aligning the upstream and downstream channels at about the center wavelengths of the CWDM channels may also be preferable to support CWDM technology. The upstream and downstream channels may be interleaved and assigned across the wavelength bands as described above to conform substantially with GPON and XGPON wavelength plans or as much as possible.

Figure 4:
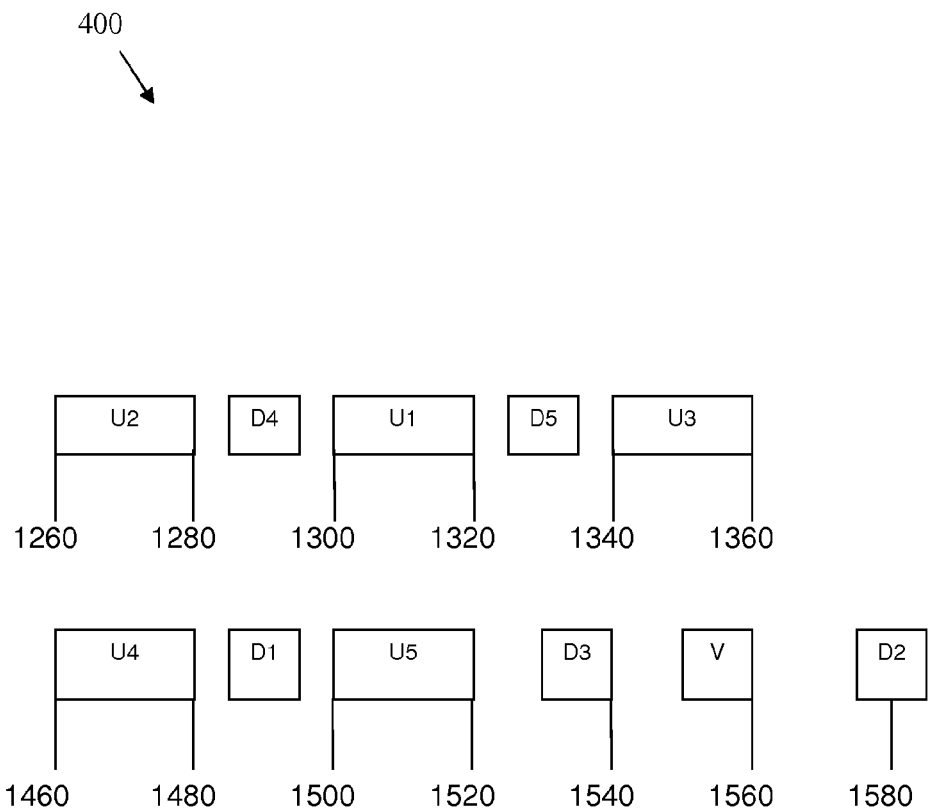
FIG. 4 is a schematic diagram of an embodiment of a wavelength assignment plan corresponding to the wavelength scheme in FIG. 3.

FIG. 4 illustrates a wavelength assignment plan 400 that corresponds to the wavelength assignment scheme 300. The wavelength assignment plan 400 comprises the five upstream channels (US1, US2, US3, US4, and US5) and the five corresponding downstream channels (DS1, DS2, DS3, DS4, and DS5) for the five operators, which may be interleaved as shown in FIG. 4 and FIG. 3. The wavelength assignment plan 400 may also comprise the video channel (V). Table 1 indicates a list of the wavelength assignment of each of the channels above. In the wavelength assignment plan 400, each downstream channel may correspond to an about 10 nm band and each upstream channel may correspond to an about 20 nm band. The upstream and downstream channels described in the wavelength assignment scheme 300 may be positioned at about the center wavelengths of the corresponding upstream and downstream bands. The range of the channel bands, e.g., the starting and ending wavelengths of the channel bands, are indicated in Table 1. In the O-band, S-band, and C-band, the channels for the different operators may have a guard band of at least about 100 nm. The interleaving of the upstream and downstream channels may allow such non-zero guard bands among channels.

TABLE 1

Wavelength Assignment of Channels.

| Channel | Downstream (nm) | Upstream (nm) |
| --- | --- | --- |
| 1 | 1485-1495 | 1300-1320 |
| 2 | 1575-1585 | 1260-1280 |
| 3 | 1525-1535 | 1340-1360 |
| 4 | 1285-1295 | 1460-1480 |
| 5 | 1325-1335 | 1500-1520 |
| Video | 1550-1560 | |

Figure 5:
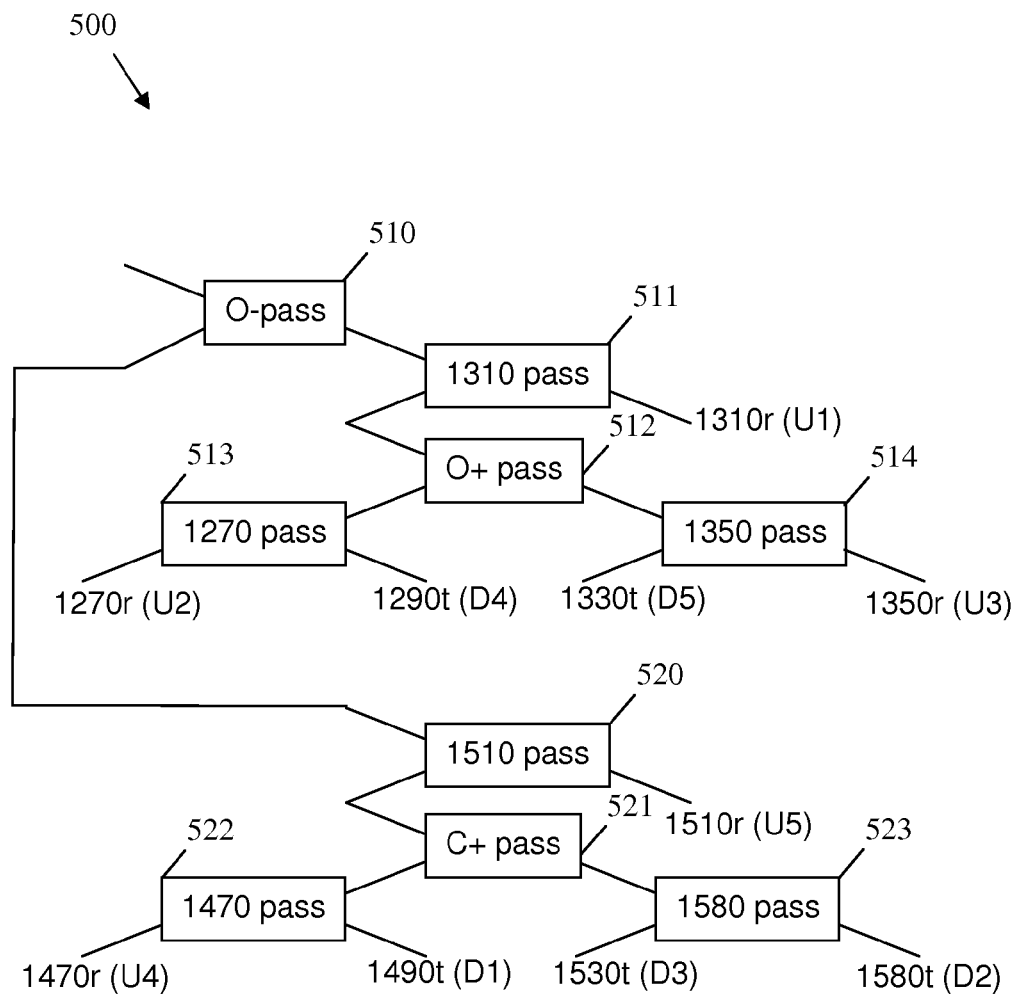
FIG. 5 is a schematic diagram of an embodiment of a filter design.

FIG. 5 illustrates an embodiment of a filter design 500, e.g., a WDM filter, which may be used in PON, e.g., a GPON or XGPON, such as the PON 100 to implement the wavelength assignment scheme 300 or the wavelength assignment plan 400. The WDM filter may be a five port filter that enables the coexistence of five OLTs for five different operators, e.g., at a central office. The five port WDM filter may allow receiving and transmitting each of the five upstream and corresponding five downstream channels, respectively, at the central office (for each corresponding OLT).

Specifically, the filter design 400 may comprise an O-band pass filter 510 that separates the five upstream and corresponding downstream channels into two paths. One of the paths may be coupled to a 1,310 nm pass filter 511 for the channels U1, U2, U3, D4, and D5, i.e., the channels assigned to the O-band. The other path may be coupled to a 1,510 nm pass filter 520 for the channels U4, U5, D1, D3, and D2, i.e., the channels assigned outside the O-band. The 1,310 pass filter 511 may separate the O-band assigned channels to two paths: a first path for receiving U1 at about 1,310 nm and a second path coupled to an O+ band filter 512. The O+ band filter 512 may separate the four remaining O-band assigned channels into two paths: a first path coupled to a 1,270 nm pass filter 513 and a second path coupled to a 1,350 nm pass filter 514. The 1,270 nm pass filter 513 may separate two of the remaining channels into two paths: a first path for receiving U2 at about 1,270 nm and a second path for transmitting D4 at about 1,290 nm. The 1,350 nm pass filter 514 may separate the two other remaining channels into two paths: a first path for receiving U3 at about 1,350 nm and a second path for transmitting D5 at about 1,330 nm. The combination of the five pass filters for transmitting and receiving the O-band assigned channels may introduce about 2.5 dB excess loss to the system, which may be considered as part of the power budget planning.

The 1,510 pass filter 520 may separate the channels assigned outside the O-band (e.g., the S-band, C-band, and L-band) to two paths: a first path for receiving U5 at about 1,510 nm (assigned to the S-band), and a second path coupled to a C+ band pass filter 521. The C+ band filter 521 may separate the four remaining channels assigned outside the O-band into two paths: a first path coupled to a 1,470 nm pass filter 522 and a second path coupled to a 1,580 nm pass filter 523. The 1,470 nm pass filter 522 may separate two of the remaining channels into two paths: a first path for receiving U4 at about 1,470 nm (in the S-band) and a second path for transmitting D1 at about 1,490 nm (in the S-band). The 1,580 nm pass filter 523 may separate the two other remaining channels into two paths: a first path for transmitting D3 at about 1,530 nm (in the C-band) and a second path for transmitting D2 at about 1,580 nm (in the L-band). The combination of the five pass filter for transmitting and receiving the channels assigned outside the O-band channels may also introduce about 2.5 dB excess loss to the system, which may also be considered in the power budget planning. Additionally, the two paths corresponding to U1 and D1 may be coupled to a first port (not shown) for a first provider OLT, and the two paths corresponding to U2 and D2 may be coupled to a second port (not shown) for a second provider OLT. Similarly, the pair of paths for each U3 and D3, U4 and D4, and U5 and D5 may be coupled to a third port (not shown) for a third provider OLT, a fourth port (not shown) for a fourth provider OLT, and a fifth port (not shown) for a fifth provider OLT, respectively.

Figure 6:
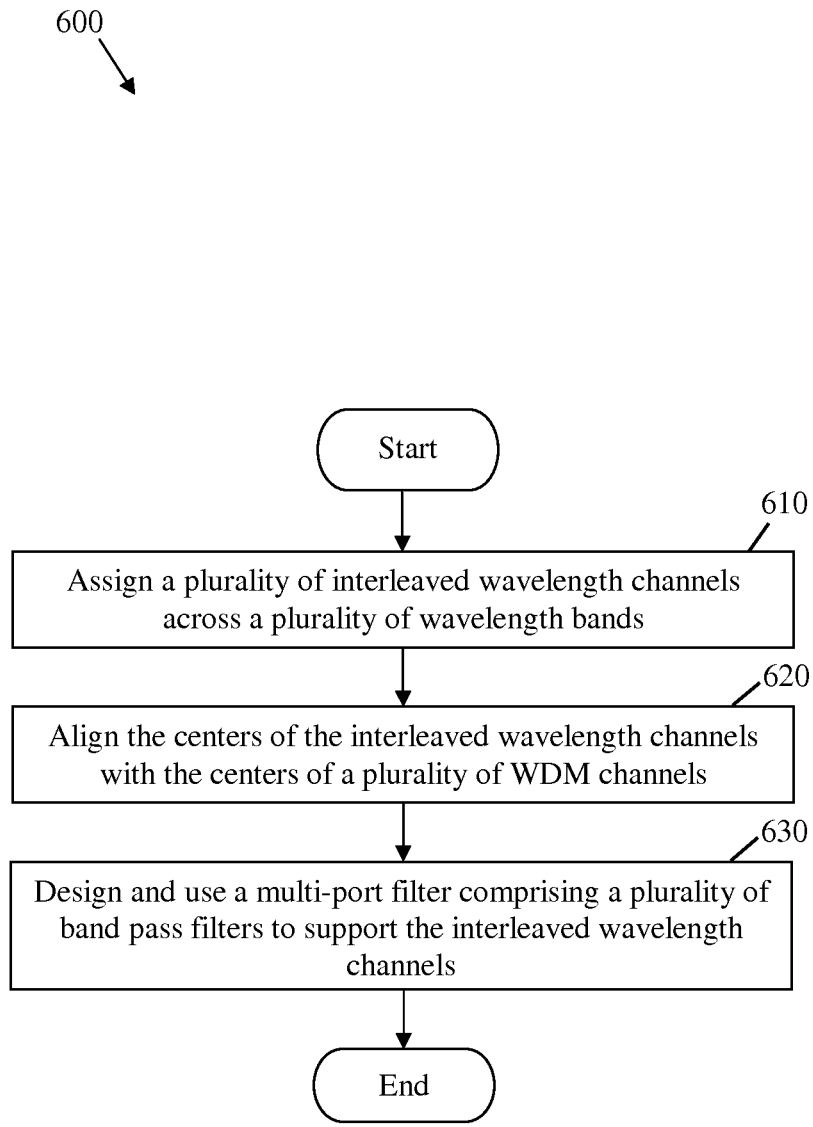
FIG. 6 is a flowchart of an embodiment of a PON wavelength assignment method.

FIG. 6 illustrates an embodiment of a PON wavelength assignment method 600 which may be used to assign a plurality of wavelengths for a plurality of providers that share an ODN. For instance, the PON wavelength assignment method 600 may be used to obtain the wavelength assignment scheme 300, the wavelength assignment plan 400, and the filter design 500. The method 600 may begin at block 610, where a plurality of interleaved wavelength channels may be assigned across a plurality of wavelength bands. The interleaved wavelength channels may comprise downstream channels interleaved between upstream channels to serve as non-zero band gaps for the upstream channels. The wavelength bands may comprise the O-band, S-band, C-band, and L-band communication bands. At block 620, the centers of the interleaved wavelength channels may be aligned with the centers of a plurality of WDM channels. The WDM channels may be CWDM channels as described above. At block 630, a multi-port filter comprising a plurality of band pass filters may be designed and used to support the interleaved wavelength channels. Each pair of upstream and downstream channels that corresponds to each of the providers may be assigned to a corresponding port in the filter. The loss introduced by the number of band pass filters in the multi-port filter may be considered as part of the power budget planning of the system.

In other embodiments, more than five upstream channels and five corresponding downstream channels may be assigned. For instance, the CWDM wavelength channels at about 1,590 nm and about 1,610 nm may be considered in addition to the other CWDM channels to interleave about six upstream channels and six corresponding downstream channels across the wavelength bands. Alternatively, more than about 18 DWDM channels may be used in the wavelength bands to assign substantially more than five or six upstream channels and corresponding downstream channels using channel interleaving and the same wavelength assignment methodology described above.

Figure 7:
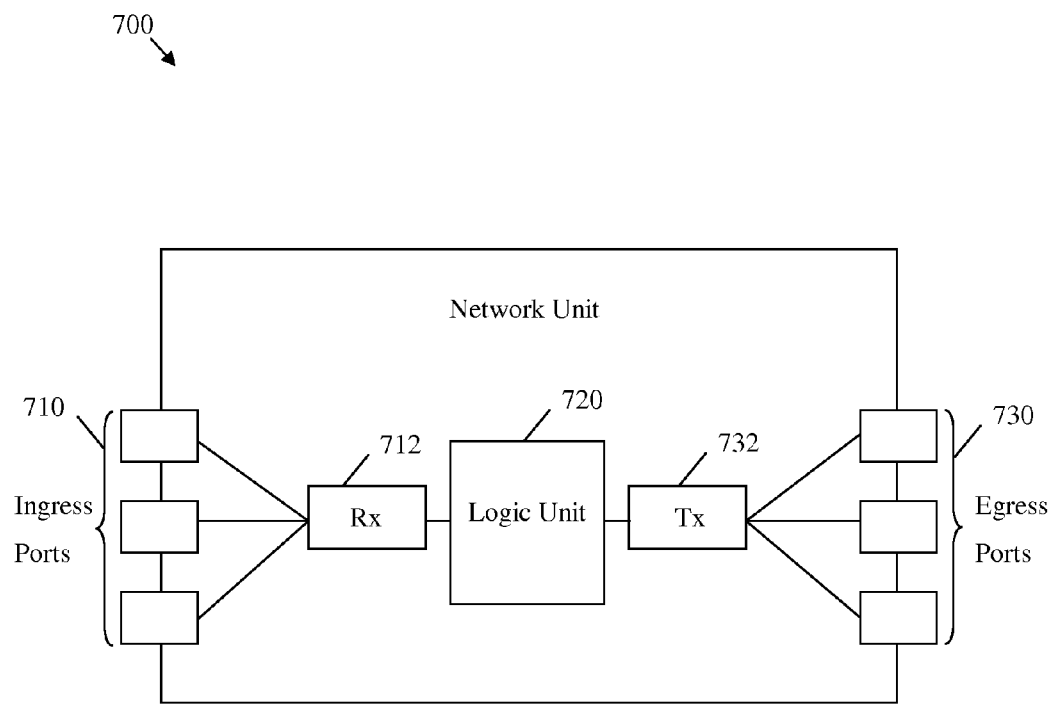
FIG. 7 is a schematic diagram of an embodiment of a network unit.

FIG. 7 illustrates an embodiment of a network unit 700, which may be any device that transports and processes data through a network, e.g., the label switched system 100. For instance, the network unit 700 may be located in any of the network components described above, e.g., at a central office that comprises a plurality of OLTs for a plurality of providers. The network unit 700 may comprise one or more ingress ports or units 710 coupled to a receiver (Rx) 712 for receiving packets, objects, or Type Length Values (TLVs) from other network components. The network unit 700 may comprise a logic unit 720 to determine which network components to send the packets to. The logic unit 720 may also implement the path computation method 400, e.g., based on the path computation algorithm selection scheme 300. The logic unit 720 may be implemented using hardware, software, or both. The network unit 700 may also comprise one or more egress ports or units 730 coupled to a transmitter (Tx) 732 for transmitting frames to the other network components. The components of the network unit 700 may be arranged as shown in FIG. 7.

Figure 8:
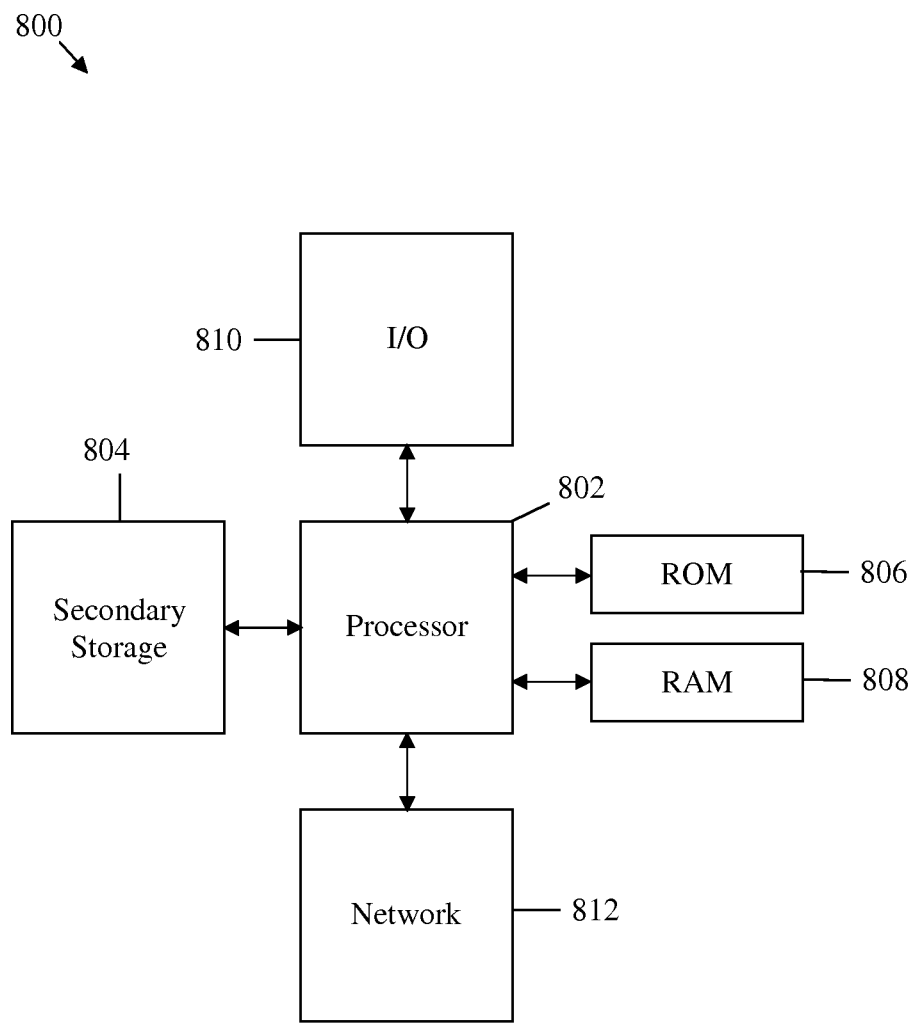
FIG. 8 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical network comprising:
an optical distribution network (ODN);
a plurality of optical line terminals (OLTs) coupled to the ODN, wherein each OLT corresponds to a provider; and
a plurality of optical network units (ONUs) coupled to the ODN and configured to communicate with the OLTs using channels in an O band, an S band, a C band, and an L band,
wherein within each band the channels are assigned in a sequence that alternates between downstream channels and upstream channels,
wherein each provider is assigned a pair of one downstream channel in one of the bands and one upstream channel in a different one of the bands,
wherein the channels are aligned with wavelength-division multiplexing (WDM) channels, and
wherein the channels satisfy design requirements for the OLTs and the ONUs.

2. The network of claim 1, wherein the downstream channels provide band gaps for the upstream channels.

3. The network of claim 1, wherein the WDM channels are coarse WDM (CDWM) channels.

4. The network of claim 1, wherein the design requirements for the OLTs and ONUs conform to a Gigabit Passive Optical Network (GPON) or ten GPON (XGPON) channel plan.

5. The network of claim 1, wherein the OLTs share a deployed passive optical network (PON) outside plant, wherein the ONUs retain un-cooled lasers, and wherein the PON does not use Dense WDM (DWDM) systems or technology.

6. The network of claim 1, wherein the O band is from about 1260 nanometers (nm) to about 1360 nm, the S band is from about 1460 nm to about 1530 nm, the C band is from about 1530 nm to about 1565 nm, and the L band is from about 1565 nm to about 1625 nm.

7. An optical network comprising:
a plurality of optical line terminals (OLTs) corresponding to different providers that share an optical distribution network (ODN); and
a plurality of optical network units (ONUs) coupled to the OLTs via the same ODN and configured to communicate with the different OLTs using different corresponding pairs of upstream and downstream channels,
wherein the design requirements for the OLTs and ONUs conform to a Gigabit Passive Optical Network (GPON) or ten GPON (XGPON) channel plan,
wherein the upstream and downstream channels are interleaved across a plurality of wavelength bands and comprise a sequence of alternating upstream and downstream channels, are aligned with a plurality of wavelength division multiplexing (WDM) channels, and satisfy a plurality of design requirements for the OLTs and ONUs,
wherein the ONUs' upstream channel bands are about 20 nanometers (nm) and receiver filters of the ONUs are about 10 nm pass with about 5 nm guard band,
wherein the GPON's or XGPON's diplexers are configured to separate upstream and downstream channels that have a guard band of at least about 100 nm, and
wherein an isolation of about −15 decibel (dB) in the ONUs is required to effectively prevent interference between the ONUs.

8. An optical network comprising:
a plurality of optical line terminals (OLTs) corresponding to different providers that share an optical distribution network (ODN); and
a plurality of optical network units (ONUs) coupled to the OLTs via the same ODN and configured to communicate with the different OLTs using, different corresponding pairs of upstream and downstream channels,
wherein the design requirements for the OLTs and ONUs conform to a Gigabit Passive Optical Network (GPON) or ten GPON (XGPON) channel plan,
wherein the upstream and downstream channels are interleaved across a plurality of wavelength bands and comprise a sequence of alternating upstream and downstream channels, are aligned with a plurality of wavelength division multiplexing (WDM) channels, and satisfy a plurality of design requirements for the OLTs and ONUs,
wherein the OLTs' downstream channel bands are about 10 nm and receiver filters of the OLTs are about 20 nm pass with about 5 nm guard band, and
wherein the OLTs' transmitters have about 3 nm tolerance in the ambient temperature range of about 0-70 degrees Celsius (C.).

9. A network component comprising:
a plurality of band pass filters comprising a plurality of ports and configured to pass channels in an O band, an S band, a C band, and an L band,
wherein within each band the channels are assigned in a sequence that alternates between downstream channels and upstream channels, and
wherein each port is assigned a pair of one downstream channel in one of the bands and one upstream channel in a different one of the bands.

10. The network component of claim 9, wherein the band pass filters comprise five band pass filters for supporting upstream and downstream channels in the O band and four band pass filters for supporting upstream and downstream channels in the S band, the C band, and the L band.

11. The network component of claim 10, wherein the five band pass filters for supporting upstream and downstream channels in the O band are configured to pass a first upstream channel at about 1,310 nanometers (nm), a second upstream channel at about 1,270 nm, and a third upstream channel at about 1,350 nm, and wherein the four band pass filters for supporting upstream and downstream channels in the S band, the C band, and the L band are configured to pass a first downstream channel at about 1,490 nm, a second downstream channel at about 1,580 nm, and a third downstream channel at about 1,530 nm.

12. The network component of claim 11, wherein the five band pass filters for supporting upstream and downstream channels in the O band are further configured to pass a fourth downstream channel at about 1,290 nm and a fifth downstream channel at about 1,330 nm, and wherein the four band pass filters for supporting upstream and downstream channels in the S band, the C band, and the L band are further configured to pass a fourth upstream channel at about 1,470 nm and a fifth upstream channel at about 1,510 nm.

13. The network component of claim 10, wherein the five band pass filters for supporting upstream and downstream channels in the O band introduce about 2.5 decibel (dB) excess loss that is considered as part of power budget planning.

14. The network component of claim 9, wherein the upstream and downstream channels comprise a plurality of upstream channels of about 20 nanometers (nm) channel width and a plurality of corresponding downstream channels of about 10 nm channel width, and wherein both the upstream and downstream channels have about 100 nm band gaps.

15. The network component of claim 14, wherein the upstream and downstream channels comprise a first upstream channel from about 1,300 nm to about 1,320 nm and a corresponding first downstream channel from about 1,485 nm to about 1,495 nm, a second upstream channel from about 1,260 nm to about 1,280 nm and a corresponding second downstream channel from about 1,575 nm to about 1,585 nm, a third upstream channel from about 1,340 nm to about 1,360 nm and a corresponding third downstream channel from about 1,525 nm to about 1,535 nm, a fourth upstream channel from about 1,460 nm to about 1,480 nm and a corresponding fourth downstream channel from about 1,285 nm to about 1,295 nm, and a fifth upstream channel from about 1,500 nm to about 1,520 nm and a corresponding fifth downstream channel from about 1,325 nm to about 1,335 nm.

16. A passive optical network (PON) wavelength assignment method comprising:
assigning, with a processor, a plurality of interleaved wavelength channels in an O band, an S band, a C band, and an L band;
assigning the channels within each band in a sequence that alternates between downstream channels and upstream channels;
assigning the channels in pairs of one downstream channel in one of the bands and one upstream channel in a different one of the bands;
aligning the centers of the interleaved wavelength channels with the centers of a plurality of wavelength-division multiplexing (WDM) channels.

17. The PON wavelength assignment method of claim 16 further comprising:

assigning a video broadcast channel in one of the wavelength bands; and aligning the center of the video broadcast channel with the center of one of the WDM channels.

18. The PON wavelength assignment method of claim 17, wherein the video broadcast channel ranges from about 1,550 nanometers (nm) to about 1,560 nm.

19. The PON wavelength assignment method of claim 16, wherein the WDM channels are coarse WDM (CWDM) channels that comprise about 18 wavelength channels.

20. The PON wavelength assignment method of claim 16, wherein the O band is from about 1260 nanometers (nm) to about 1360 nm, the S band is from about 1460 nm to about 1530 nm, the C band is from about 1530 nm to about 1565 nm, and the L band is from about 1565 nm to about 1625 nm.

* * * * *

UNITED STATES PATENT AND TRADEMARK OFFICE
CERTIFICATE OF CORRECTION

PATENT NO.       : 8,761,611 B2
APPLICATION NO.  : 13/185632
DATED            : June 24, 2014
INVENTOR(S)      : Yuanqiu Luo It is certified that error appears in the above-identified patent and that said Letters Patent is hereby corrected as shown below:

In the Claims

Column 11, Lines 34-57, Claim 8 should read:

An optical network comprising:
a plurality of optical line terminals (OLTs) corresponding to different providers that share an optical distribution network (ODN); and
a plurality of optical network units (ONUs) coupled to the OLTs via the same ODN and configured to communicate with the different OLTs using different corresponding pairs of upstream and downstream channels,
wherein the design requirements for the OLTs and ONUs conform to a Gigabit Passive Optical Network (GPON) or ten GPON (XGPON) channel plan,
wherein the upstream and downstream channels are interleaved across a plurality of wavelength bands and comprise a sequence of alternating upstream and downstream channels, are aligned with a plurality of wavelength division multiplexing (WDM) channels, and satisfy a plurality of design requirements for the OLTs and ONUs,
wherein the OLTs' downstream channel bands are expected to be at about 10 nm and the OLTs' receiver filters of the OLTs are expected to have about 20 nm pass with about 5 nm guard band, and wherein the OLTs' transmitters have about 3 nm tolerance in the ambient temperature range of about 0-70 degrees Celsius (C).

Signed and Sealed this
Seventh Day of October, 2014

Michelle K. Lee
*Deputy Director of the United States Patent and Trademark Office*